(12) United States Patent
Ambekar et al.

(10) Patent No.: US 11,647,118 B1
(45) Date of Patent: May 9, 2023

(54) SYSTEM AND METHOD FOR PRIORITIZING TENANTS FOR A SERVICE FOR A REQUEST ROUTER IN A CLOUD-BASED SOFTWARE AS A SERVICE (SAAS) PLATFORM CONTACT-CENTER

(71) Applicant: inContact INC., Sandy, UT (US)

(72) Inventors: Harshad Ambekar, Pune (IN); Salil Dhawan, Pune (IN); Swati Kadu, Pune (IN)

(73) Assignee: INCONTACT INC., Sandy, UT (US)

( * ) Notice: Subject to any disclaimer, the term of this patent is extended or adjusted under 35 U.S.C. 154(b) by 0 days.

(21) Appl. No.: 17/862,431

(22) Filed: Jul. 12, 2022

Related U.S. Application Data

(63) Continuation of application No. 17/503,372, filed on Oct. 18, 2021, now Pat. No. 11,477,322.

(51) Int. Cl.
   *H04M 3/523* (2006.01)
   *H04M 3/51* (2006.01)
   *H04L 67/10* (2022.01)

(52) U.S. Cl.
   CPC .......... *H04M 3/5232* (2013.01); *H04L 67/10* (2013.01)

(58) Field of Classification Search
   None
   See application file for complete search history.

(56) References Cited

U.S. PATENT DOCUMENTS

| | | | |
|---|---|---|---|
| 9,106,724 B1* | 8/2015 | Harris | H04M 3/5183 |
| 2001/0043589 A1* | 11/2001 | Kikinis | H04M 7/006 |
| | | | 370/352 |
| 2011/0255675 A1* | 10/2011 | Jasper | H04M 3/523 |
| | | | 379/265.09 |
| 2017/0163798 A1* | 6/2017 | Minert | H04M 3/36 |

(Continued)

*Primary Examiner* — Harry S Hong
(74) *Attorney, Agent, or Firm* — Soroker Agmon Nordman Riba

(57) ABSTRACT

A computerized-method for service monitoring and rate limiting for a service for a request router in a SaaS-platform-contact-center is provided herein. When a service-monitoring-module for a microservice of the SaaS-platform-contact-center is operating and a request-router is in a throttle-mode for a service-of-the-microservice, operating a Tenants Prioritization (TP) module. The TP module includes: determining a tenant-tier-level having a determined quota-of-service-requests; receiving a degradation-level from the service-monitoring-module, for a preconfigured-period; reducing corresponding predefined total-number-of-allowed-requests by a first-threshold, when the degradation-level of the service-of-the-microservice has degraded by a second-threshold, during the preconfigured-period; increasing the corresponding predefined total-number-of-allowed-requests by the first-threshold, when the degradation-level of the service-of-the-microservice has improved by the second-threshold, during the preconfigured period; and instructing the request-router to get out of throttle-mode for the service-of-the-microservice, when the degradation-level of the service-of-the-microservice has improved by the second-threshold during the preconfigured period and there is an indication that the service-of-the-microservice has been degraded.

16 Claims, 16 Drawing Sheets

(56) References Cited

U.S. PATENT DOCUMENTS

| | | | |
|---|---|---|---|
| 2018/0109602 A1* | 4/2018 | Doctor | H04L 43/12 |
| 2019/0123973 A1* | 4/2019 | Jeuk | G06F 9/5027 |
| 2020/0242532 A1* | 7/2020 | Kawamoto | G06Q 10/06393 |
| 2020/0374398 A1* | 11/2020 | Sharma | G06Q 10/063112 |
| 2021/0120393 A1* | 4/2021 | Jensen | H04L 69/22 |

* cited by examiner

| Tiers | Quota | Allowed API requests | | | | | | |
|---|---|---|---|---|---|---|---|---|
| | | 100 | 50 | 40 | 30 | 25 | 20 | 10 |
| 0 | 2% | 2 | 1 | 1 | 1 | 1 | 0 | 0 |
| 1 | 8% | 8 | 4 | 3 | 2 | 2 | 2 | 1 |
| 2 | 15% | 15 | 8 | 6 | 4 | 4 | 3 | 2 |
| 3 | 20% | 20 | 10 | 8 | 6 | 5 | 4 | 2 |
| 4 | 25% | 25 | 13 | 10 | 8 | 6 | 5 | 3 |
| 5 and above | 30% | 30 | 15 | 12 | 9 | 8 | 6 | 3 |

| TenantId | Status | Account Impact Score | Tenant type | Tenant trend indicator | Agent activity levels | Call queue size |
|---|---|---|---|---|---|---|
| 1 | ACTIVE | 0 | Trial | 1 | 0.5 | 0 |
| 2 | ACTIVE | 35 | Customer | 2 | 0.9 | 5 |
| 3 | ACTIVE | 10 | Partner | 1 | 0.1 | 9 |

| Service Id | Service name | Status | Allowed request count | Throttle mode | Degradation level |
|---|---|---|---|---|---|
| 1 | Service1 | NORMAL | 100 | OFF | 0 |
| 2 | service2 | DEGRADED | 50 | ON | 1 |

| Tenant | Tenant type | Tenant trend indicator | Logged-in agents | Active agents | Agent activity levels | Account impact score | Call queue size | Tenant request prioritization score | Tenant tier |
|---|---|---|---|---|---|---|---|---|---|
| T1 | Trial | 0 | 100 | 0 | 0 | 0 | 1 | 0 | 0 |
| T10 | Customer | 1 | 100 | 10 | 0.1 | 20 | 4 | 2.9 | 2 |
| T11 | Customer | 1 | 100 | 50 | 0.5 | 20 | 4 | 3.3 | 3 |
| T15 | Customer | 1 | 100 | 50 | 0.5 | 30 | 2 | 3.9 | 3 |
| T16 | Customer | 1 | 100 | 50 | 0.5 | 30 | 5 | 4.5 | 4 |
| T23 | Customer | 2 | 100 | 10 | 0.1 | 40 | 4 | 5.7 | 5 |
| T24 | Customer | 1 | 100 | 10 | 0.1 | 40 | 4 | 4.9 | 4 |

| Tier | Request sent | Request Allowed | Request Throttled |
|---|---|---|---|
| 0 | 10 | 7 | 3 |
| 1 | 10 | 7 | 3 |
| 2 | 10 | 6 | 4 |
| 3 | 10 | 2 | 8 |
| 4 | 10 | 5 | 5 |
| 5 | 10 | 3 | 7 |

| Tier | Request sent | Request Allowed | Request Throttled |
|---|---|---|---|
| 0 | 10 | 8 | 2 |
| 1 | 10 | 3 | 7 |
| 2 | 10 | 5 | 5 |
| 3 | 10 | 4 | 6 |
| 4 | 10 | 5 | 5 |
| 5 | 10 | 5 | 5 |

| Tier | Quota |
|---|---|
| 0 | 2% |
| 1 | 8% |
| 2 | 15% |
| 3 | 20% |
| 4 | 25% |
| 5 and above | 30% |

| Requests Allowed |
|---|
| 1 |
| 2 |
| 4 |
| 6 |
| 8 |
| 9 |

| Tier | Request sent | Request Allowed | Request Throttled |
|---|---|---|---|
| 0 | 10 | 1 | 9 |
| 1 | 10 | 2 | 8 |
| 2 | 10 | 4 | 6 |
| 3 | 10 | 6 | 4 |
| 4 | 10 | 8 | 2 |
| 5 | 10 | 9 | 1 |

Figure 15B

| Tier | Request sent | Request Allowed | Request Throttled |
|---|---|---|---|
| 0 | 10 | 1 | 9 |
| 1 | 10 | 2 | 8 |
| 2 | 10 | 4 | 6 |
| 3 | 10 | 6 | 4 |
| 4 | 10 | 8 | 2 |
| 5 | 10 | 9 | 1 |

SYSTEM AND METHOD FOR PRIORITIZING TENANTS FOR A SERVICE FOR A REQUEST ROUTER IN A CLOUD-BASED SOFTWARE AS A SERVICE (SAAS) PLATFORM CONTACT-CENTER

RELATED APPLICATIONS

This application claims priority as a continuation from application Ser. No. 17/503,372 dated Oct. 18, 2021, the disclosure of which is incorporated herein by reference.

TECHNICAL FIELD

The present disclosure relates to the field of throttling processes in a cloud-based computing environment. More specifically, the present disclosure relates to the field of service request rate limiting and throttling based on tenant prioritization in a cloud environment that is operating a Software as a Service (SaaS) based contact center.

BACKGROUND

An availability of a cloud-based SaaS solution that is serving contact centers is of prime importance, especially for 24/7 contact centers. When systems get overwhelmed by too many service requests or when systems performance degrades, the contact center availability may be at risk. Accordingly, when one of the services, that is provided to the contact center system, by a SaaS based contact center software, receives a surge of requests or when the service latency crosses a threshold value or when one or more monitored parameters such as Central Processing Unit (CPU) utilization, memory utilization, service data store CPU utilization, and the like cross a threshold value, an intentional limiting request rate for service, i.e., throttling of service, may be applied by a request router, on each one of the cloud-based SaaS solution tenants, i.e., contact centers.

Such an intentional slow of service may directly influence the activity of each contact center, regardless of the number of the contact center's active agents. Current technical solutions do not prioritize tenants by tenant specific parameters and hence the intentional limiting request rate for service, i.e., throttling of service by a request router, may be equally applied for all tenants regardless of the tenants number of active agents, tenant call queue size and tenant priority.

Contact centers activity levels depend mostly on agents' activity levels, which may be indicated by the volume of ongoing interactions between agents and customers and the call queue size. Providers of cloud-based SaaS solutions commonly maintain information on traffic trends for tenants, for a specific period around special days like Valentine Day, Thanksgiving Day etc., where internet traffic is expected to increase for some of the tenants. Providers of cloud-based SaaS solutions also maintain information as to the importance of each tenant, which may be a combination of several parameters that indicates the importance of the tenant to the provider.

Accordingly, there is a need for a technical solution that will take into consideration contact center, i.e., tenant specific parameters, such as agent activity level, call queue size, tenant account impact score and tenant trends when a request router enters throttle mode to prioritize tenants, such that tenants having high value parameters may be throttled for service later than tenants having low value parameters.

Furthermore, there is a need for a method and a system for prioritizing tenants for a service for a request router in a cloud-based Software as a Service (SaaS) platform contact-center.

SUMMARY

There is thus provided, in accordance with some embodiments of the present disclosure, a computerized-method for prioritizing tenants for a service for a request router in a cloud-based Software as a Service (SaaS) platform contact-center.

Furthermore, in accordance with some embodiments of the present disclosure, in a cloud-computing environment that is operating a SaaS platform-contact-center for one or more tenants, the cloud-computing environment may comprise one or more processors, a data store of one or more tenants, and a data store of Tenants Prioritization (TP) of a request router.

Furthermore, in accordance with some embodiments of the present disclosure, when a service monitoring module for a microservice may be operating and the request-router may be in a throttle mode for a service of the microservice of the SaaS-platform-contact-center, the one or more processors may be operating a Tenants Prioritization (TP) module for each tenant in the data store of one or more tenants.

Furthermore, in accordance with some embodiments of the present disclosure, the TP module may include: (i) receiving a degradation level from the service monitoring module. Each degradation level has a corresponding total number of allowed requests per service instance. (ii) periodically pulling data from an Automatic Call Distribution (ACD) system to calculate agent-activity-levels and call-queue-size; (iii) maintaining the calculated agent-activity-levels, the calculated call-queue-size, tenant trend indicator and a preconfigured account-impact-score of the tenant, in the data store of TP; (iv) determining a tenant tier-level based on a calculated Tenant Request Prioritization (TRP) score; Each tier-level has a corresponding quota of service requests from a total number of allowed requests and the corresponding quota of service requests is a number of allowed requests per tenant tier-level and (v) providing the tenant tier-level and a number of allowed requests per tenant tier-level to the request-router, to provide the service to the tenant and other tenants having the determined tier-level, in a preconfigured time-window, based on the tenant tier-level and the number of allowed requests per tenant-tier-level.

Furthermore, in accordance with some embodiments of the present disclosure, the service monitoring module may be operating to: (i) define a degradation level based on one or more parameters; (ii) store the degradation level in the data store of TP; and (iii) set the request-router into a throttle mode for the service of the microservice.

Furthermore, in accordance with some embodiments of the present disclosure, the corresponding quota of service requests of each tier-level is a percentage of the total number of allowed requests.

Furthermore, in accordance with some embodiments of the present disclosure, the TP module may be operating while there is an indication that the service of the microservice has been degraded.

Furthermore, in accordance with some embodiments of the present disclosure, the one or more parameters may be selected from at least one of: Central Processing Unit (CPU) utilization of service, service data store CPU utilization, number of requests for a service and request latency.

Furthermore, in accordance with some embodiments of the present disclosure, the service monitoring module may be further operated to determine the number of allowed requests per tenant tier-level based on the degradation level, a number of instances of the service and the corresponding quota of service requests of the tier-level.

Furthermore, in accordance with some embodiments of the present disclosure, the calculated agent activity levels may be based on formula I:

Agent activity levels=average of (number of active agents/total number of logged-in agents) (I)

wherein the agent activity levels are calculated for a preconfigured period.

Furthermore, in accordance with some embodiments of the present disclosure, the TRP score may be calculated based on formula II:

TRP score=($W_1$×account impact score)+($W_2$×agent activity levels)+($W_3$×tenant trend indicator×call queue size) (II)

whereby:

$W_1$, $W_2$ and $W_3$ are which and a value of $W_1$, $W_2$ and $W_3$ may be preconfigured. The value of $W_1$, $W_2$ and $W_3$ may be preconfigured by default to: $W_1$=0.1, $W_2$=1.0 and $W_3$=0.2.

Furthermore, in accordance with some embodiments of the present disclosure, the determining of the tenant tier-level based on the calculated Tenant Request Prioritization (TRP) score may be based on one or more ranges of TRP score. Each range of the one or more ranges of TRP score may be preconfigured to correspond to a tier-level.

Furthermore, in accordance with some embodiments of the present disclosure, the account impact score may be preconfigured according to one or more parameters. The one or more parameters may be selected from at least one of: health score, handle critical services, partner type, success package, market segment and specific partner.

Furthermore, in accordance with some embodiments of the present disclosure, when the service monitoring module for a microservice may be monitoring one or more parameters which indicate that the service has been degraded, the service monitoring module may be redefining the degradation level.

There is further provided, in accordance with some embodiments of the present disclosure, a computerized-system for prioritizing tenants for a service for a request router in a cloud-based Software as a Service (SaaS) platform contact-center.

Furthermore, in accordance with some embodiments of the present disclosure, the computerized-system may include: one or more processors; a data store of one or more tenants; a data store of tenants Prioritization (TP), and a request router.

Furthermore, in accordance with some embodiments of the present disclosure, when a service monitoring module for a microservice of the SaaS-platform-contact-center may be operating and the request-router may be in a throttle mode for a service of the microservice, the one or more processors may be operating for each tenant in the data store of one or more tenants, a Tenants Prioritization (TP) module, the TP module may be configured to: (i) receiving a degradation level from the service monitoring module. Each degradation level has a corresponding total number of allowed requests per service instance. (ii) periodically pull data from an Automatic Call Distribution (ACD) system to calculate agent-activity-levels and call-queue-size; (iii) maintain the calculated agent-activity-levels, call-queue-size, and a preconfigured account-impact-score of the tenant, in the data store of TP; (iv) determine a tenant tier-level based on a calculated Tenant Request Prioritization (TRP) score; Each tier-level has a corresponding quota of service requests from a total number of allowed requests and the corresponding quota of service requests is a number of allowed requests per tenant tier-level, and (v) provide the tenant tier-level and the number of allowed requests per tenant tier-level to the request-router, to provide the service to the tenant and other tenants having the determined tier-level, in a preconfigured time-window, based on the tenant tier-level and the number of allowed requests per tenant tier level.

BRIEF DESCRIPTION OF THE DRAWINGS

FIG. 7 is a table that depicts how based on allowed request count the requests are allowed per tenant tier-level, in accordance with some embodiments of the present disclosure;

FIG. 11 is an example of a table for calculating an account impact score for a tenant, in accordance with some embodiments of the present disclosure;

FIG. 12A is an example of a tenant prioritization table, in accordance with some embodiments of the present disclosure;

FIG. 12B is an example of a service status table, in accordance with some embodiments of the present disclosure;

FIG. 13 is a table of simulation data shows how TRP score and tenant tier-level varies based on contact center specific parameters, in accordance with some embodiments of the present disclosure;

FIG. 14A-14B are tables depicting results before an implementation of TP module when there are allowed request count has been set to 30 requests per second and the requests are sent in random order:

FIG. 15A is a table of quota for TP module, in accordance with some embodiments of the present disclosure; and FIGS. 15B-15C are tables depicting tenants prioritization based on an implementation of TP module, in accordance with some embodiments of the present disclosure.

DETAILED DESCRIPTION

Figure 1:
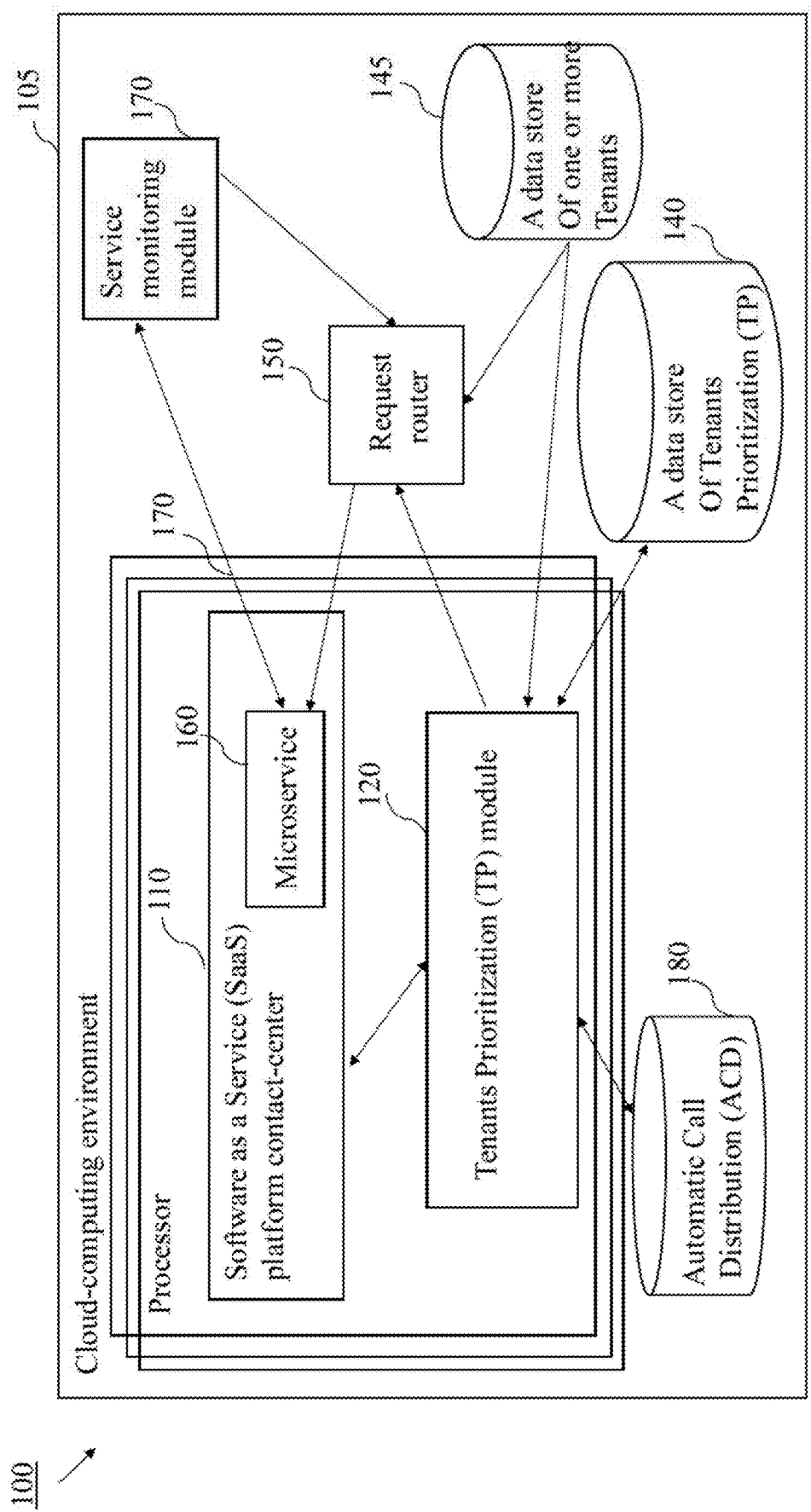
FIG. 1 schematically illustrates a high-level diagram of a system for prioritizing tenants for a service for a request router in a cloud-based Software as a Service (S) platform contact-center, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, fore example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "Microservice (MS)", as used herein, refers to a small component that is independent from other components. For example, when the components of the present disclosure are operating in an AWS platform, the microservice may be a spring boot MS that is deployed on an Amazon Elastic Container Service (ECS) cluster. Spring boot is an open-source Java-based framework used to create an MS. Amazon ECS is a regional service that simplifies running containers across multiple availability zones.

The term "request" as used herein refers to service requests which are provided by a microservice, via a request router.

The term "call queue", as used herein, refers to any type of interactions queue which the contact center supports, such as emails, chats, voice and the like.

The term "call queue size", as used herein, refers to the volume of interactions in that queue, which are waiting to be resolved by agents in the contact center.

The term "Lambda", as used herein, refers to Amazon serverless compute service.

A cloud-based Software as a Service (SaaS) platform contact-center, is a bundle of contact center application services provided to tenants in a cloud environment, over the internet. Each service may be provided to a webapp or microservices via a request router. For example, a Nginx is an Application Programming Interface (API) request router.

A service request throttling is a process of limiting the number of service requests that a user can make in a certain period via a request router. When a request router enters into a throttle mode it throttles service requests for any random tenants as there is no tenant-based prioritization in current solutions. In the throttle mode, when there is no tenants prioritization or hierarchy, the request router limits the number of service requests, per second, equally for all tenants.

A 24/7 contact center availability is of prime importance and it is a requirement for many tenants, i.e., customers of a cloud-based SaaS platform contact center provider. A provider of cloud-based SaaS platform contact center has dozens, hundreds or thousands of tenants, commonly with service level hierarchy. It may be significant that premium tenants or high-tier tenants, e.g., tenants having a high account impact score, will have high availability to sustain their business continuity, even when a request router enters a throttle mode. Disruptions for tenants which are handling critical services like healthcare, language translations or accidental insurance, may have cascading effects to the business, as well as human life at times.

SaaS cloud-based current solutions, which are designed for contact centers, must throttle the requests to prevent the underlying systems from being overwhelmed, in case of a sudden surge of service requests or service degradation. For example, when the Central Processing Unit (CPU) utilization of a service crosses a threshold. In another example, when the service data store CPU utilization crosses a threshold. In yet another example, when too many requests have been received by a service than it can handle or latency of the API.

Using standard throttling algorithms, which do not prioritize service requests based on tenant type and activity levels, may cause premium tenants. e.g., having a high impact score and high activity levels to slow down or could even halt their operations for some time till the underlying systems recover.

Therefore, there is a need for a technical solution that will take into consideration tenants parameters, such as, agent activity level, call queue size tenant account impact score and tenant trends when a request router enters into throttle mode to prioritize tenants, such that premium tenants or tenants having high value parameters may be throttled for service later than tenants having low value parameters.

Furthermore, there is a need for a method and a system for prioritizing tenants for a service for a request router in a cloud-based Software as a Service (SaaS) platform contact-center.

FIG. 1 schematically illustrates a high-level diagram of a system 100 for prioritizing tenants for a service for a request router in a cloud-based Software as a Service (SaaS) platform contact-center, in accordance with some embodiments of the present disclosure.

According to some embodiments of the present disclosure, a computerized system, such as system 100 may operate in a cloud-computing environment, such as cloud-computing environment 105. The cloud-computing environment 105 may include one or more processors 170, a data store of one or more tenants, such as data store 145, a data store of tenants Prioritization (TP), such as a data store of TP 140, and a request router, such as request router 150 for a microservice, such as microservice 160.

According to some embodiments of the present disclosure, the system 100 may operate to perform request throttling to mitigate risk based on multiple factors, which are related to contact center functions. When services start to degrade, the load of the services needs to be restricted so that the services can perform effectively. Throttling service requests, such as API services on the basis of tenants' workload, e.g., agents activity level and their tier level, or a calculated Tenant Request Prioritization (TRP) score that reflects their tier level, may result in a better experience to high tier-level tenants or premium tenants, e.g., tenants having a high TRP score and high activity levels.

Figure 2:
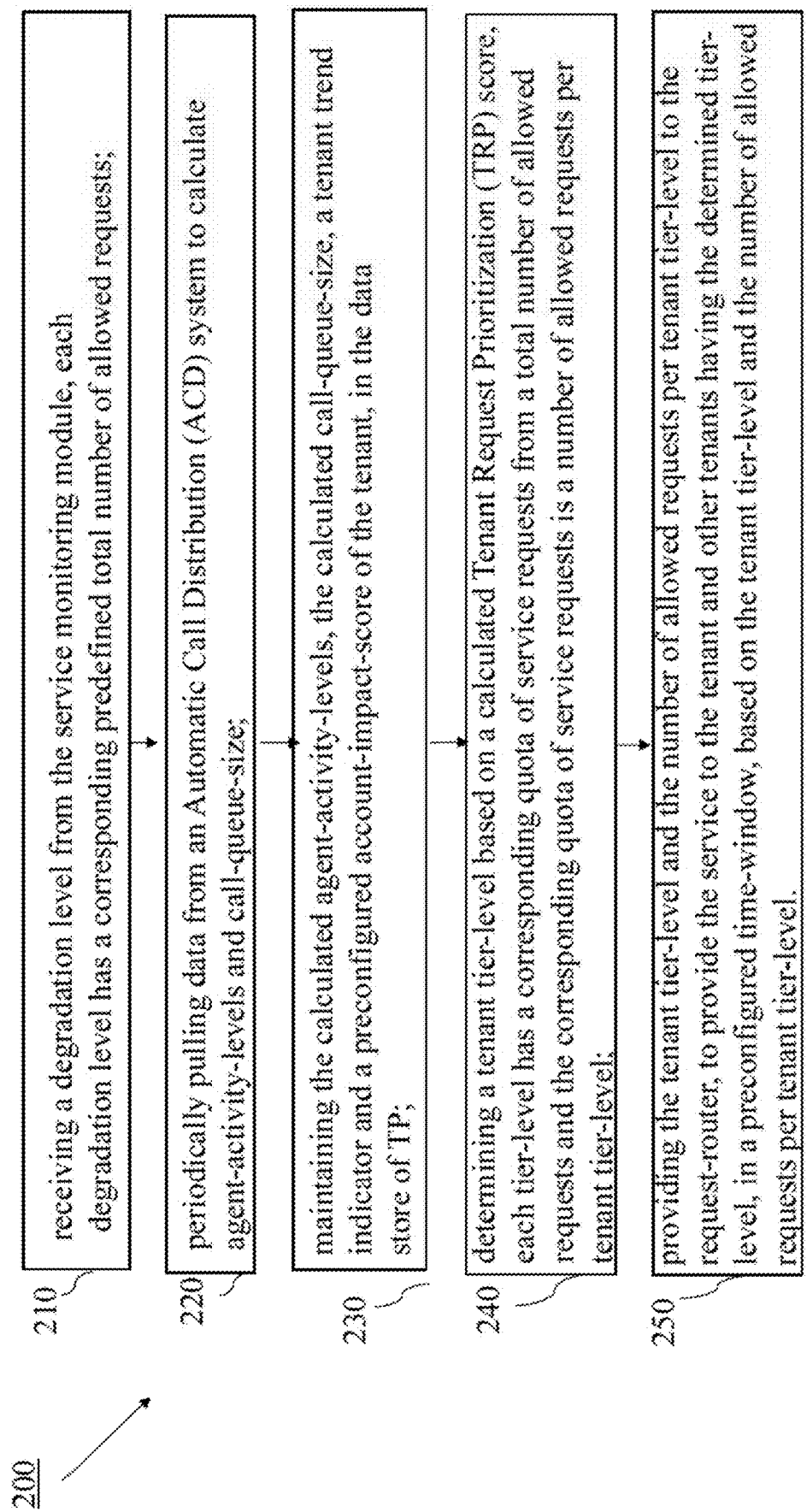
FIG. 2 is a high-level workflow of a Tenants Prioritization (TP) module, in accordance with some embodiments of the present disclosure.

According to some embodiments of the present disclosure, when a reporting mechanism may indicate that a service starts to degrade or when a service monitoring module, such as a service monitoring module 170, for a microservice 160 of a SaaS platform contact center, such as SaaS platform-contact-center 110, may indicate that a request router, such as request router 150 should enter into throttle mode, for a service of the microservice 160, one or more processors 170 may operate a module, such as Tenants Prioritization (TP) module 120 and such as TP module 200 in FIG. 2, for each tenant in the data store of one or more tenants 145.

According to some embodiments of the present disclosure, an indication that a service is degrading and a request router 150 should enter into throttle mode for that service, may be for example, an alarm that may be raised when one of the services starts degrading. When this alarm is raised, a request router, such as request router 170 may enter into throttle mode for that service. In a non-limiting example, the request router may be Nginx, which is an API requests router.

According to some embodiments of the present disclosure, when a service monitoring module for a microservice of the SaaS-platform-contact-center 110, such as service monitoring module 170 may be operating and the request router 170 may enter a throttle mode for a service of a microservice, such as microservice 160, the request router 170 may allow service requests of tenants in a prioritized manner for that service, such that service requests of tenants having high priority will be responded before service requests of tenants having low priority.

According to some embodiments of the present disclosure, one or more processors, such as one or more processors 170 may operate a module, such as Tenants Prioritization (TP) module 120 and such as TP module 200 in FIG. 2, to prioritize tenants based on their tenant trend indicator, call queue size, account impact score and agents activity levels. The TP module 120 may operate while there is an indication that the service of the microservice has been degraded to a specific degradation-level.

According to some embodiments of the present disclosure, the TP module 120 may receive a degradation-level from the service monitoring module 170. Each degradation-level has a corresponding total number of allowed requests that the request router may handle per second.

According to some embodiments of the present disclosure, the TP module 120 may periodically pull data from an Automatic Call Distribution (ACD) system, such as ACD system 180 to calculate agent-activity-levels and call-queue-size. High agents activity levels may be monitored using periodical analysis of agents activity and a call-queue-size. System 100 may give preference to service requests coming from tenants having a high account impact score and high activity levels thereby preventing disruptions for those tenants. Service requests for tenants having low account impact score and low activity levels may be throttled after a certain limit.

Figure 11:
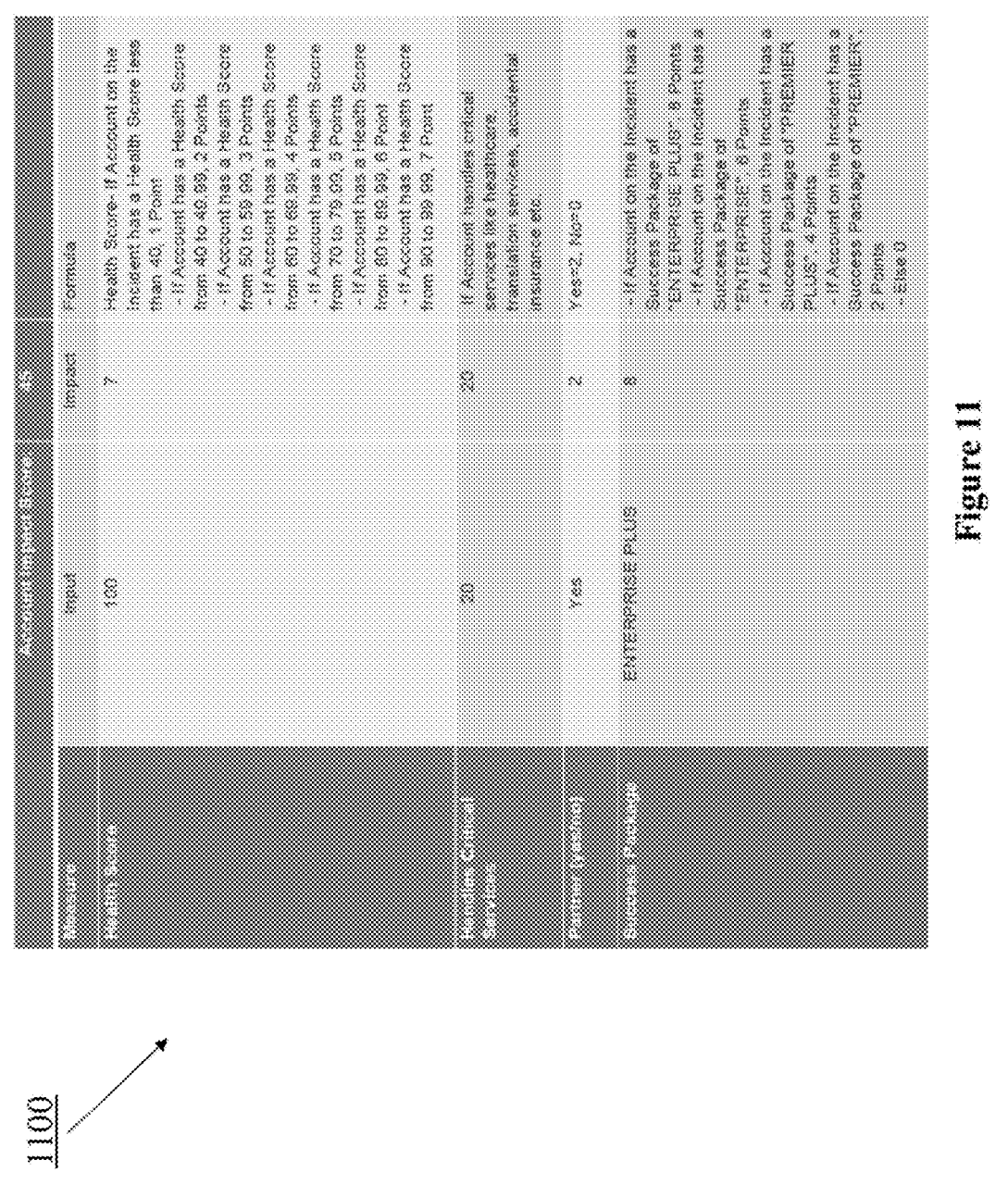

According to some embodiments of the present disclosure, calculated agent-activity-levels, calculated call-queue-size, a tenant trend indicator and a preconfigured account-impact-score of the tenant, may be maintained in a data store, such as data store of TP 140. The preconfigured account impact score may be preconfigured based on parameters, as shown in FIG. 11. The one or more parameters may be selected from at least one of: health score, handle critical services, partner type, success package, market segment and specific partner.

According to some embodiments of the present disclosure, the tenant trend indicator may provide information on traffic trends of tenants during a specific period, e.g., a period around special days like Valentine Day, Thanksgiving day etc. where internet traffic may be expected to increase for some of the tenants.

According to some embodiments of the present disclosure, the calculated agent activity levels may be calculated for a preconfigured period and may be based on formula I:

$$\text{Agent activity levels} = \text{average of (number of active agents/total number of logged-in agents)}. \quad (I)$$

Figures 10A, 10B:
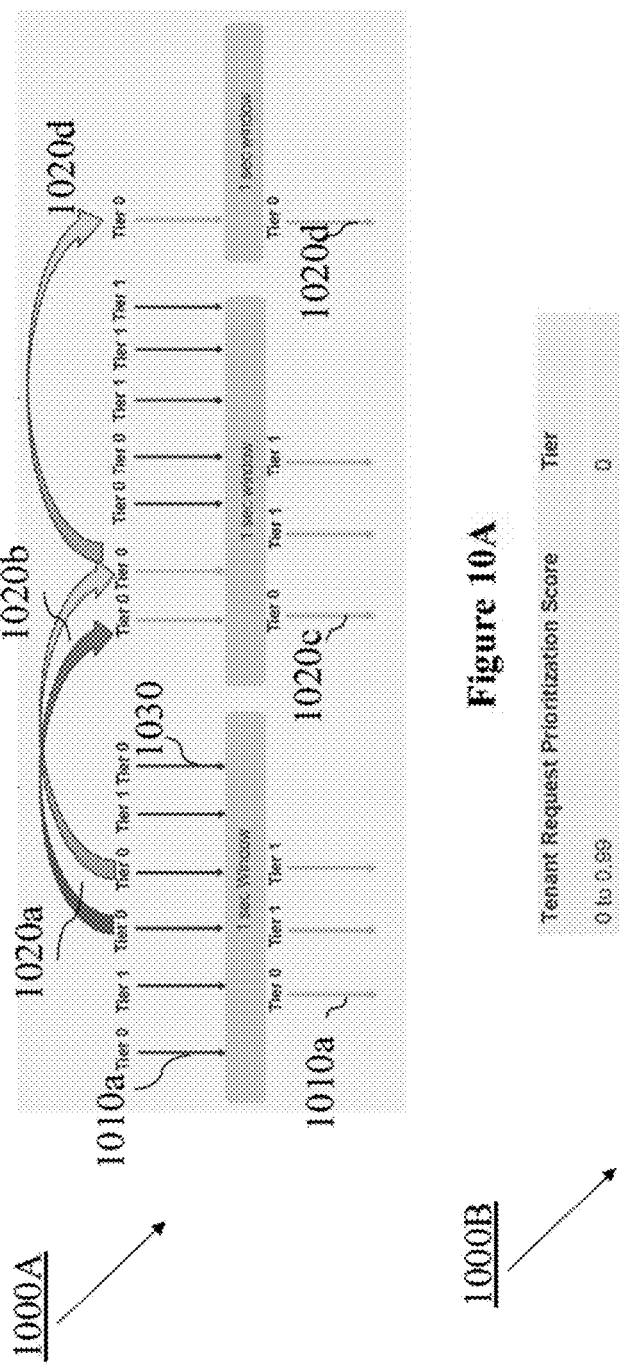
FIG. 10A is an example of rate limit and throttling based on Tenant Prioritization (TP) module, in accordance with some embodiments of the present disclosure.
FIG. 10B is an example of a tier categorization as per Tenant Request Prioritization (TRP) score, in accordance with some embodiments of the present disclosure.

According to some embodiments of the present disclosure, the TP module 120 may determine a tenant tier-level based on a calculated Tenant Request Prioritization (TRP) score, as shown in FIG. 10B. Each tier-level may have a corresponding quota of service requests. The quota is a percentage of a total number of allowed requests per second that is associated for each tier level. The quota corresponding to the tier level remains during the throttle mode. The total allowed requests may change according to the received degradation-level.

According to some embodiments of the present disclosure, the total number of allowed requests at each degradation-level may be predetermined. It may be predetermined based on various performance tests which have been performed on the service. The performance tests help to determine at each degradation-level how much service-requests a server instance can handle successfully.

Accordingly, the total number of allowed requests at each degradation-level may be determined as the product of the number of service requests of the server instance at a degradation-level multiplied by the amount of server instances in the system. Various tools exist for performance tests, such as Gatling which determine how many requests a service instance can handle during a degradation level.

According to some embodiments of the present disclosure, the TP module 120 may provide the tenant tier-level and the total number of allowed requests to the request-router 150. The request router 150 may provide the service to the tenant and other tenants having the determined tier-level, in a preconfigured time-window, based on the corresponding quota of service requests per tenant tier-level from the total number of allowed requests, as shown in FIG. 10A. The determined quota of requests per tenant per tenant tier-level may be for example, as shown, by table 700 in FIG. 7. The corresponding quota of service requests is a number of allowed requests per tenant tier-level.

According to some embodiments of the present disclosure, service requests within the same tier-level may be provided based on first come first served. The account impact score may determine the initial tier-level of a tenant. The premier customers will have high account impact score and in accordance get a higher tier-level, as compared to other tenants. It may be least likely to have majority of tenants in tier 5 and above as account impact score may ensure that premier customers get a high account impact score.

According to some embodiments of the present disclosure, most of the tenants of the SaaS-platform-contact-center provider may have account impact score in the range of 5 to 25_whereas premier tenants may have higher account impact score that is greater than 35. This scoring may ensure that premier customers will receive maximum of the bandwidth e.g., service requests per second, in case of service degradation to ensure that their services are not disrupted.

According to some embodiments of the present disclosure, a typical mid-tier tenant, e.g., tier-level 3 or 4 may enter into tier 5 only when it has high agent activity level, high number of call queue size or high tenant trend indicator. All these parameters are continuously monitored and if they increase beyond a threshold there are risk mitigation actions which are already planned in a contact center to ensure that the parameters stay below threshold. Therefore, the time a typical mid-tier tenant may be scored with a TRP score that corresponds to a higher tier-level may be very limited.

According to some embodiments of the present disclosure, the TRP score may be calculated based on formula II:

$$\text{TRP score} = (W_1 \times \text{account impact score}) + (W_2 \times \text{agent activity levels}) + (W_3 \times \text{tenant trend indicator} \times \text{call queue size}) \quad \text{(III)}$$

whereby:
$W_1$, $W_2$ and $W_3$ are weights and the value of $W_1$, $W_2$ and $W_3$ may be preconfigured. For example, the value of $W_1$, $W_2$ and $W_3$ may be preconfigured by default to: $W_1=0.1$, $W_2=1.0$ and $W_3=0.2$.

According to some embodiments of the present disclosure, the service monitoring module 170 for a microservice 160 of the SaaS-platform-contact-center 110, may be operating to: (i) define a degradation level based on one or more parameters; (ii) store the degradation level in the data store of TP 140; and (iii) set the request-router 150 into a throttle mode for the service of the microservice 160. The one or more parameters may be selected from at least one of: Central Processing Unit (CPU) utilization of service, service data store CPU utilization, number of requests for a service and request latency.

According to some embodiments of the present disclosure, the corresponding quota of service requests of each tier-level is a percentage of the total number of allowed requests.

According to some embodiments of the present disclosure, when the service monitoring module 170 for a microservice, such as microservice 160 may be monitoring one or more parameters and one or more parameters may indicate that the service has been degraded, the service monitoring module 170 may be redefining the degradation-level which has a corresponding total number of allowed requests per service instance.

FIG. 2 is a high-level workflow of a Tenants Prioritization (TP) module 200, in accordance with some embodiments of the present disclosure.

According to some embodiments of the present disclosure, operation 210 may comprise receiving a degradation level from the service monitoring module, each degradation level has a corresponding total number of allowed requests.

According to some embodiments of the present disclosure, operation 220 may comprise periodically pulling data from an Automatic Call Distribution (ACD) system to calculate agent-activity-levels and call-queue-size.

According to some embodiments of the present disclosure, operation 230 may comprise maintaining the calculated agent-activity-levels, the calculated call-queue-size, a tenant trend indicator and a preconfigured account-impact-score of the tenant, in the data store of TP.

According to some embodiments of the present disclosure, operation 240 may comprise determining a tenant tier-level based on a calculated Tenant Request Prioritization (TRP) score, each tier-level has a corresponding quota of service requests from a total number of allowed requests and the corresponding quota of service requests is a number of allowed requests per tenant tier-level.

According to some embodiments of the present disclosure, operation 250 may comprise providing the tenant tier-level and the number of allowed requests per tenant tier-level to the request-router, to provide the service to the tenant and other tenants having the determined tier-level, in a preconfigured time-window, based on the tenant tier-level and the number of allowed requests per tenant tier-level.

Figure 3:
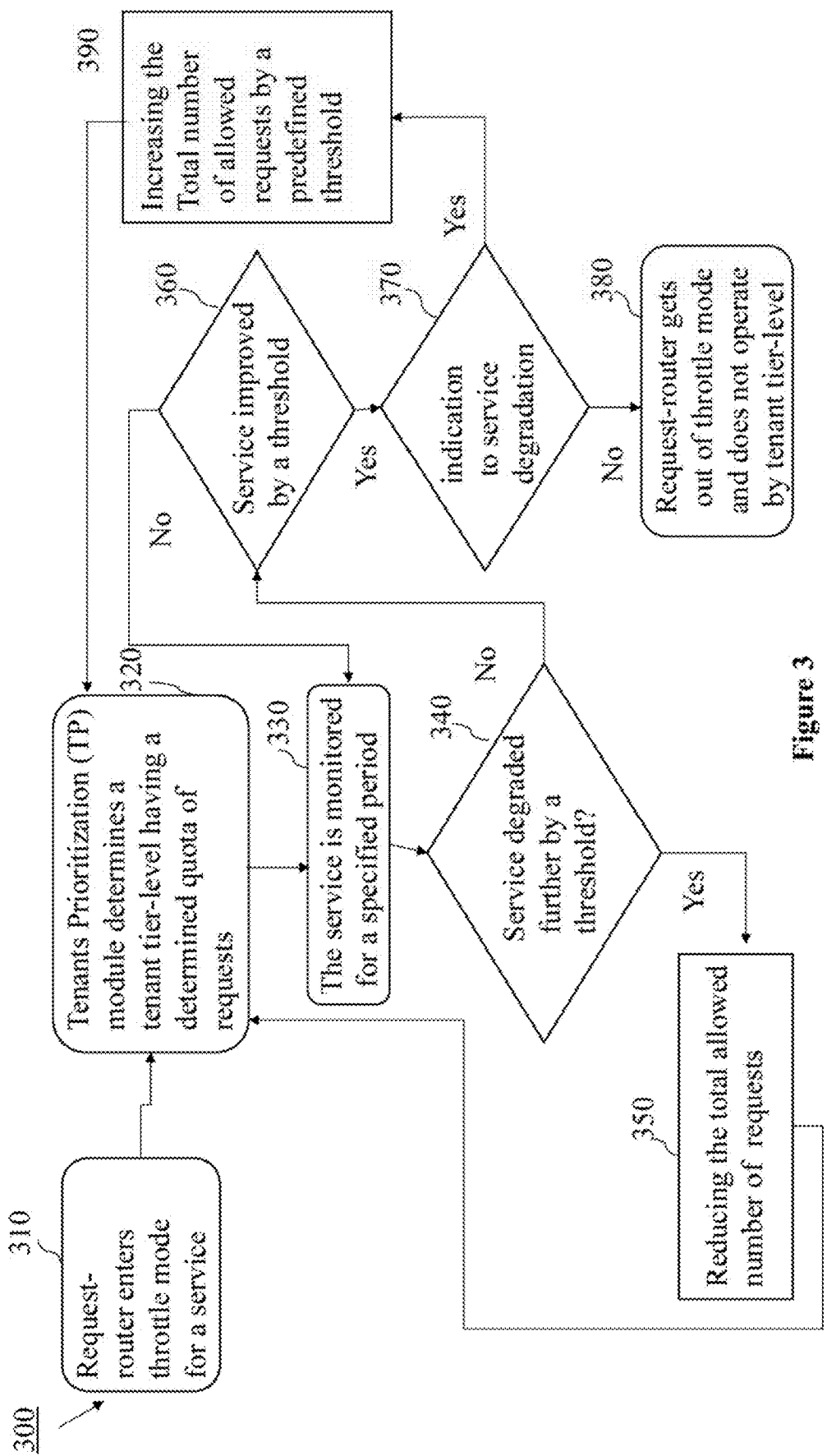
FIG. 3 is a high-level diagram of service monitoring and rate limiting for a service for a request router in a cloud-based Software as a Service (SaaS) platform contact-center, in accordance with some embodiments of the present disclosure.

FIG. 3 is a high-level diagram 300 of service monitoring and rate limiting for a service for a request router in a cloud-based Software as a Service (SaaS) platform contact-center, in accordance with some embodiments of the present disclosure.

According to some embodiments of the present disclosure, when a reporting mechanism of service degradation, such as alarm, may be triggered, a request router, such as request router 150 in FIG. 1 may enter a throttled mode for that service 310.

According to some embodiments of the present disclosure, Tenants Prioritization (TP) module determines a tenant tier-level having a determined quota of requests 320. The TP module, such as TP module 120 in FIG. 1 and TP module 200 in FIG. 2 may determine a tenant tier-level based on a calculated Tenant Request Prioritization (TRP) score. Each tier-level has a corresponding quota of service requests from a total number of allowed requests.

According to some embodiments of the present disclosure, a request router such as request router 150 in FIG. 1, or Nginx router may apply a rate limiting and throttling based on the tenant tier-level and the number of allowed requests per tenant tier-level.

According to some embodiments of the present disclosure, the service may be monitored for a specified period 330 after the rate limiting. For example by a module, such as monitoring module 170 in FIG. 1. One or more service parameters may be monitored to check if the service has degraded further by a threshold 340.

According to some embodiments of the present disclosure, when the service has degraded by a threshold value, reducing the total allowed number of requests by a certain threshold 350 and then having TP module determine a tenant tier-level having a determined quota of requests 320.

According to some embodiments of the present disclosure, when the service didn't degrade checking if service has improved by a threshold 360. If service has not improved keep monitoring the service parameters for a specified period 330.

According to some embodiments of the present disclosure, when the service has improved by a threshold checking if there is no indication to service degradation 370 and then if there is no such indication, e.g., an alarm is turned off, the request routers may get out of throttle mode 380 for that service, which means that there is no rate limiting of requests for that service.

According to some embodiments of the present disclosure, when there is an indication to service degradation, e.g., an alarm is on, but the service is improving, then increasing the allowed service requests by a predefined threshold 390 and then having the TP module determine a tenant tier-level having a determined quota of requests 320.

Figure 4:
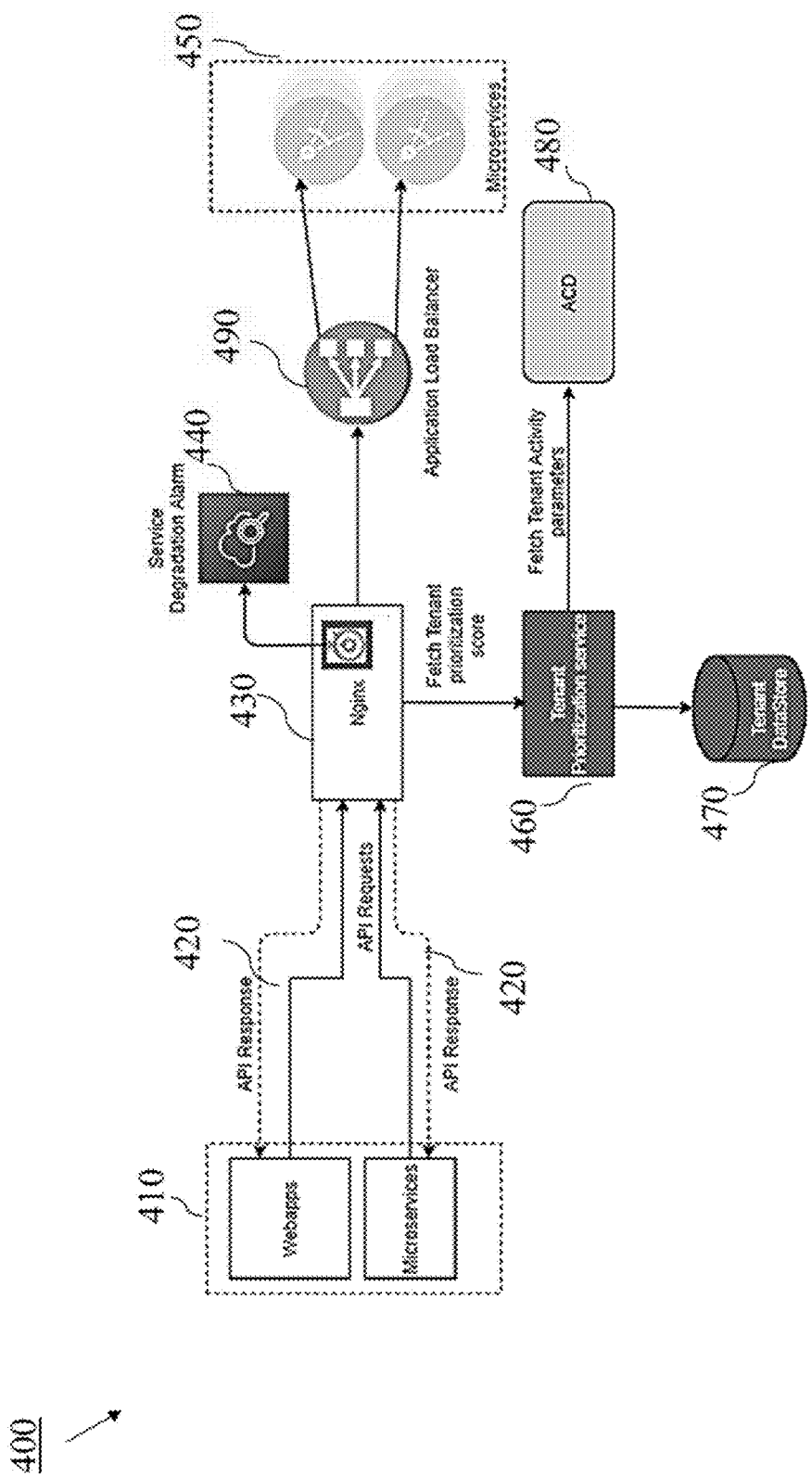
FIG. 4 is an example of a high-level architecture of an implementation of a system which includes a system for prioritizing tenants for a service for a request router, in a cloud-based Software as a Service (SaaS) platform contact-center, in accordance with some embodiments of the present disclosure.

FIG. 4 is an example 400 of a high-level architecture of an implementation of a system which includes a system for prioritizing tenants for a service for a request router, in a cloud-based Software as a Service (SaaS) platform contact-center, in accordance with some embodiments of the present disclosure.

According to some embodiments of the present disclosure, example 400 shows an optional architectures of an implementation of a system, such as system 100 in FIG. 1, for prioritizing tenants for a service for a request router in a cloud-based Software as a Service (SaaS) platform contact-center that applies rate limiting and throttling of requests from tenants based on tenant account impact score, tenants agents activity levels, call-queue-size and tenant trend indicator.

According to some embodiments of the present disclosure, webapps and microservices 410 may send service requests such as Application Programming Interface (API) requests 420 to microservices 450 via a request router, such as Nginx 430.

According to some embodiments of the present disclosure, for each service that is provided by a microservice from a plurality of microservices 450, the corresponding total number of allowed requests, e.g., allowed API requests, may be determined based on number of instances for each degradation-level. It may be predetermined based on various performance tests which have been performed on the service.

According to some embodiments of the present disclosure, when there is an indication that the service of the microservice has been degraded, a reporting mechanism, such as service degradation alarm 440 turns an alarm on for a request router such as Nginx 430, based on one or more parameters related to the service, such as Central Processing Unit (CPU) utilization of service, service data store CPU utilization, number of requests for a service and request latency. When the alarm is turned on the Nginx enters throttle mode Tenant Prioritization (TP) service 460, such as TP module 120 in FIG. 1 and such as TP module 200 in FIG. 2 may start operating.

According to some embodiments of the present disclosure, TP service 460, such as TP module 120 in FIG. 1 and such as TP module 200 in FIG. 2, may receive a degradation-level from a module, such as the service monitoring module 170 in FIG. 1, for the microservice 450. The degradation-level may start from 1. At each degradation-level, based on the number of available healthy service instances, the allowed total number of requests may be determined.

According to some embodiments of the present disclosure, when the Nginx 430 is in throttle mode, the TP service 460 may periodically pull data from an Automatic Call Distribution (ACD) system, such as ACD 480 to calculate agent-activity-levels and call-queue-size and then the TP service may maintain the calculated agent-activity-levels, the calculated call-queue-size, a tenant trend indicator and a preconfigured account-impact-score of the tenant, in a data store of TP, such as Tenant datastore 470.

According to some embodiments of the present disclosure, a microservice may receive requests from the Nginx 430 via an application load balancer 490.

According to some embodiments of the present disclosure, the TP service 460 may provide for each tenant in the tenant datastore 470 the tenant tier-level and the total number of allowed requests to the request-router, e.g., Nginx 430 to provide the service to the tenant and other tenants having the determined tier-level, in a preconfigured time-window, based on the corresponding quota of service requests per tenant tier-level from the total number of allowed requests. Each request to the microservices 450 is responded along time. The corresponding quota of service requests is a number of allowed requests per tenant tier-level.

Figure 5:
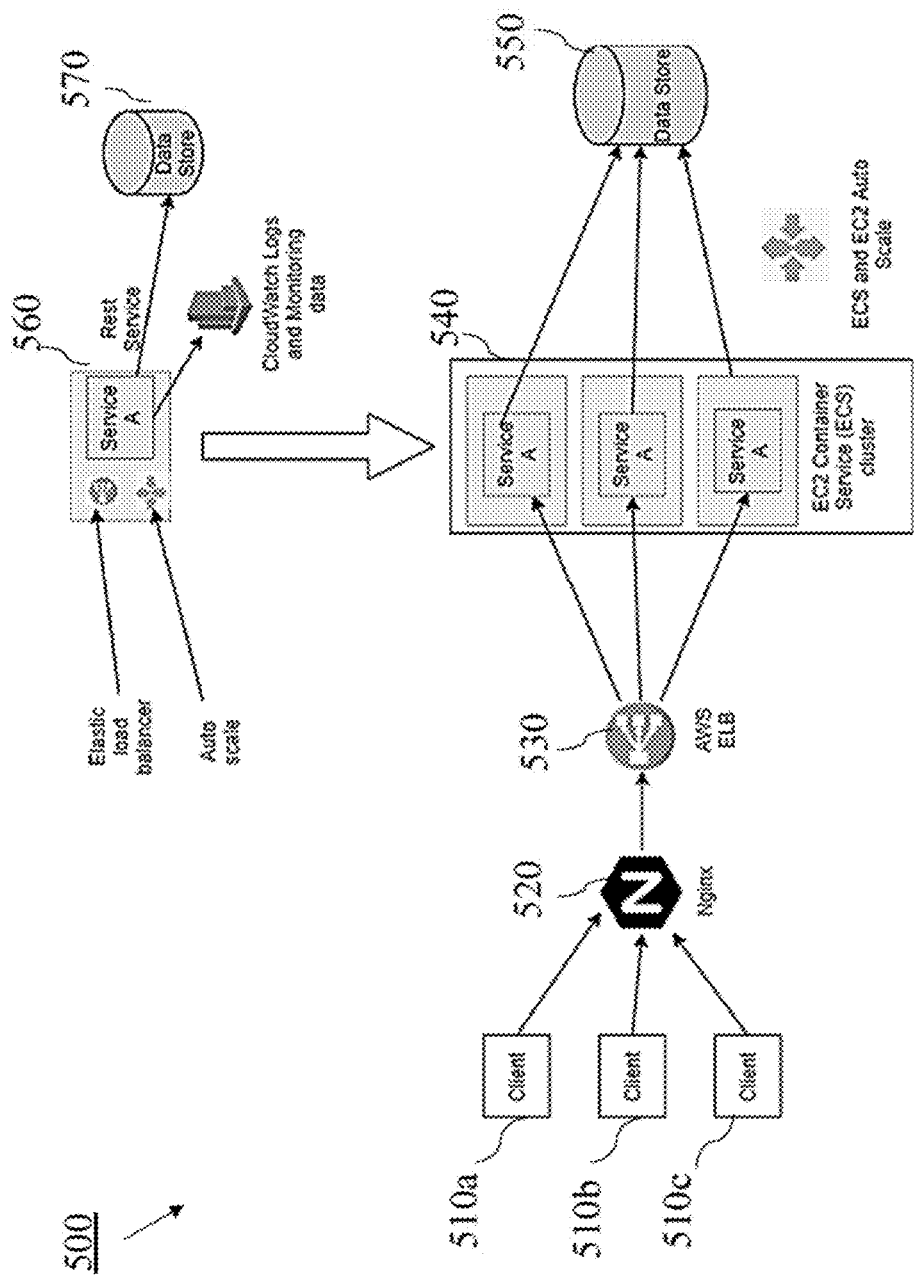
FIG. 5 is an example of an implementation of a microservice architecture, in accordance with some embodiments of the present disclosure.

FIG. 5 is an example 500 of an implementation of a microservice architecture, in accordance with some embodiments of the present disclosure.

According to some embodiments of the present disclosure, in a non-limiting example when system 100 in FIG. 1 may be implemented in Amazon Web Services (AWS) infrastructure. Each of the microservices, such as microservice 160 in FIG. 1, may be installed inside a docker container named as Amazon EC2 Instance, such as EC2 540. Amazon EC2 instance is a virtual server in Amazon's Elastic Compute Cloud (EC2) for running applications on the AWS infrastructure.

According to some embodiments of the present disclosure, each microservice may be having at least two server instances or may be configured to many instances to provide high availability solution with different configurations of central Processing Unit (CPU), memory storage, and networking resources to suit user needs.

According to some embodiments of the present disclosure, the requests to microservice from clients 510a-510c may be routed through the request router such as Nginx 520. An Elastic Load Balancer (ELB) 530 may be attached to every microservice instance. An ELB is a load-balancing service for Amazon Web Services (AWS) deployments. The ELB automatically distributes incoming application traffic and scales resources to meet traffic demands.

According to some embodiments of the present disclosure, the purpose of automatic scaling is to automatically increase the size of auto scaling group when demand goes up and decrease it when demand goes down. Each service, such as service 560 may store data in a common data store 570. The data store 570 is configured in such a way that one or more services, such as service 506, e.g., multiple services 540 can simultaneously access it. When the system, such as system 100 in FIG. 1, may be implemented in the AWS environment, the services 540 logs data to AWS logs and has monitoring parameters configured in AWS Cloudwatch metrics, which may be retrieved by a module, such as service monitoring module 170 in FIG. 1.

Figure 6:
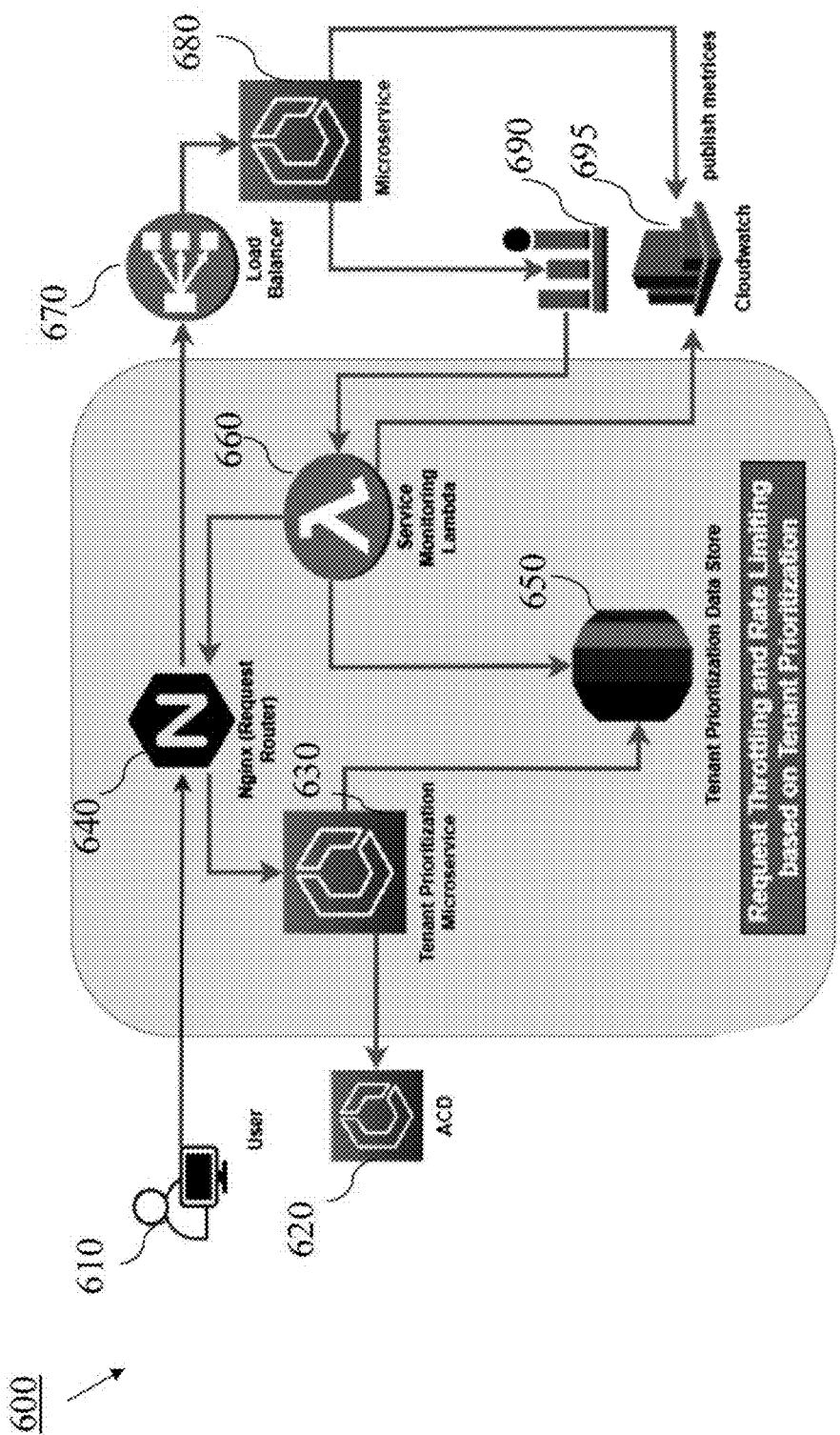
FIG. 6 is an example of a high-level architecture of an implementation of a system method for prioritizing tenants for a service for a request router in a cloud-based Software as a Service (SaaS) platform contact-center, in accordance with some embodiments of the present disclosure; in accordance with some embodiments of the present disclosure.

FIG. 6 is an example 600 of a high-level architecture of an implementation of a system method for prioritizing tenants for a service for a request router in a cloud-based Software as a Service (SaaS) platform contact-center, in accordance with some embodiments of the present disclosure.

According to some embodiments of the present disclosure, a user, such as user 610 may operate a service of a SaaS-platform contact center, such as SaaS-platform contact center 110 in FIG. 1. The service may be responded by a microservice such as microservice 680, and such as microservice 160 in FIG. 1, via a request router, such as Nginx (request router) 640 and load balancer 670.

According to some embodiments of the present disclosure, a reporting mechanism of service degradation in a system, such as system 100 in FIG. 1, may report on a service degradation, in a non-limiting example, by raising a service degradation alarm as to a microservice, such as microservice 160 in FIG. 1, that indicates that the service has crossed a preconfigured thresholds which were set for monitoring one or more parameters, such as Central Processing Unit (CPU) utilization, memory utilization, service data store CPU utilization, latency of API's, too many request received by a service then it can handle and the like.

According to some embodiments of the present disclosure, a microservice, such as microservice 160 in FIG. 1, publishes metrices to a metrics repository, such as AWS CloudWatch 695 at frequent intervals. These metrices may be used for service monitoring, e.g., service monitoring module 170 in FIG. 1. The metrices which are published are number of requests per second, heath state etc.

According to some embodiments of the present disclosure, when a service degradation alarm is raised 690 a service monitoring module, such as service monitoring module 170 in FIG. 1 e.g. service monitoring lambda 660 may be triggered. The service monitoring module 170 in FIG. 1 e.g. service monitoring lambda 660 may determine the service degradation-level based on the monitoring one or more parameters and may operate a scheduler so that service monitoring lambda 660 may be triggered at frequent interval, e.g., every minute to monitor the service degradation development. Once the service monitoring module 170 in FIG. 1 e.g., service monitoring lambda 660 may observe that there is no indication for service degradations, e.g., service degradation alarm is turned off, the service monitoring module 170 in FIG. 1 e.g., service monitoring lambda 660 scheduler may also be terminated.

According to some embodiments of the present disclosure, the service monitoring module 170 in FIG. 1, e.g., service monitoring lambda 660 may receive the microservice metrices from metrics repository, such as AWS CloudWatch 695. Based on these matrices the service degradation-level may be determined. For example, the service degradation level may begin from level 1.

According to some embodiments of the present disclosure, the service monitoring module 170 in FIG. 1, e.g., service monitoring lambda 660 may update the service state in a data store such as Tenant Prioritization (TP) data store 650 and such as a data store of TP 140 in FIG. 1 and may set a throttle mode a request router, such as Nginx (request router) 640 and such as request router 150 in FIG. 1, for the service.

According to some embodiments of the present disclosure, the service monitoring module 170 in FIG. 1, e.g., service monitoring lambda 660 may set the allowed total number of requests per second for the service for each service degradation level. The quota percentage for each tier-level may be predetermined based on how much bandwidth needs to be allocated for the tier-level. The quota allocation may be a contact center decision based on tenant usage of a service or usage forecasting.

According to some embodiments of the present disclosure, a module, such as TP microservice 630 and such as TP module 120 in FIG. 1, and such as TP module 200 in FIG. 2 may periodically pull the data from Automatic Call Distribution (ACD) system, such as ACD system 620 and such as ACD system 180 to calculate agent-activity-levels and call-queue-size.

According to some embodiments of the present disclosure, the TP microservice 630 and such as TP module 120 in FIG. 1, and such as TP module 200 in FIG. 2 may maintain the agents activity levels, call queue size, tenant trend indicator and account impact score in a data store such as Tenant Prioritization (TP) data store 650 and such as a data store of TP 140 in FIG. 1. The tenant trend indicator may either set manually or by observing past trends of the tenant activity.

According to some embodiments of the present disclosure, when a user, such as user 610 calls a service API it is routed via a request router, such as Nginx (request router) 640. The API needs to have a bearer token else it will be redirected to login page. If the request router is in throttle mode for the service, the rate limiting and throttling may be applied by operating a TP module, such as TP microservice 630 and such as TP module 120 in FIG. 1 and such as TP module 200 in FIG. 2 to provide the request router, such as Nginx (request router) 640 the tenant tier-level and the total number of allowed requests. Based on the provided tier-level of the tenant, meaning tier-level of the user that sent the service request, when the tier-level is high, it is most likely that the request may be routed to the microservice 680 and when the tier-level is low it is likely that the request may be throttled. This is because higher tier-level may have more bandwidth e.g., more allowed service requests per second and commonly very few tenants are allocated to that tier-level.

FIG. 7 is a table 700 that depicts how based on allowed request count the requests are allowed per tenant tier-level, in accordance with some embodiments of the present disclosure.

According to some embodiments of the present disclosure, each service may serve a certain number of service requests, such as API requests when it is in a healthy state. Hence, when service degradation starts a request rate limiting may be applied so that the service is not overwhelmed with too many requests. Moreover, since autoscaling takes time, until the service autoscales it's important to apply a request rate limit and throttle the requests.

According to some embodiments of the present disclosure, the quota for each tier-level may be predefined based on tenant usage of the service and future usage forecasting. Based on future forecasting of added tenants and existing tenants, the account impact score being of each tenant may be revised and it may be evaluated which tier-levels may start having more requests. Based on this forecasting the tier-level quota may be revised. Similarly, if on frequent monitoring it is observed that a certain tier-level has many requests or few requests then the quota may be revised to ensure that the allocated bandwidth i.e. number of requests per second, is effectively utilized.

According to some embodiments of the present disclosure, table 700 is an example that depicts how tenant tier-level based rate limiting may be applied based on a predefined quota for each tenant tier-level.

According to some embodiments of the present disclosure, when the total number of allowed requests is 100, then following will be request allowed for each tier-level: Tier 0 tenants—2 requests per second; Tier 1 tenants—8 requests per second; Tier 2 tenants—15 requests per second; Tier 3 tenants—20 requests per second Tier 4 tenants—25 requests per second; Tier 5 and above tenants—30 requests per second.

Figure 8:
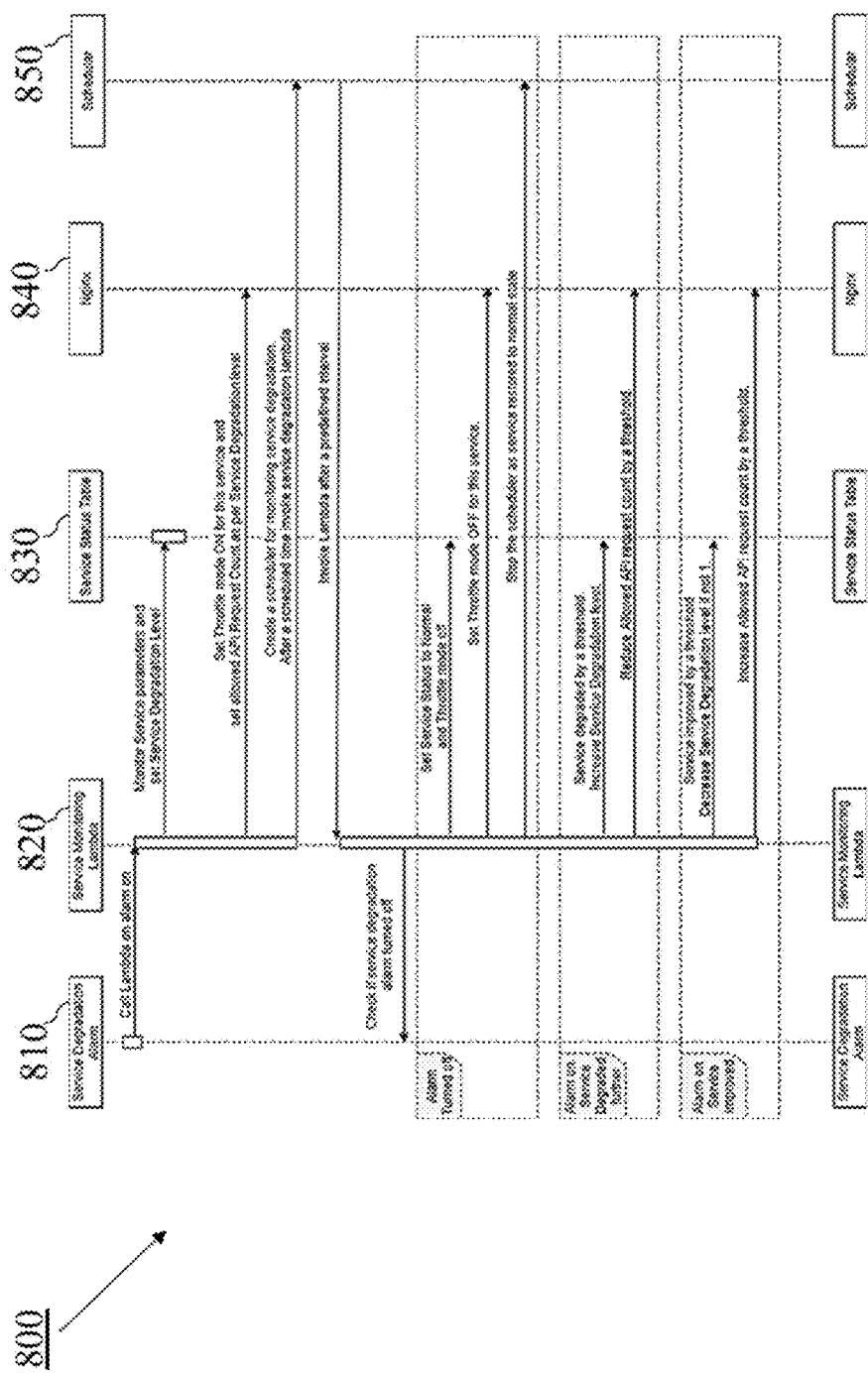
FIG. 8 is an example of a workflow of service degradation monitoring sequence for a request router, such as Nginx, in accordance with some embodiments of the present disclosure.

FIG. 8 is an example 800 of a workflow of service degradation monitoring sequence for a request router, such as Nginx, in accordance with some embodiments of the present disclosure.

According to some embodiments of the present disclosure, a service such as microservice 160 in FIG. 1 may be monitored from an indication that there is service degradation to an indication that there is no service degradation, e.g., alarm onto alarm being off. During this period the total allowed number of requests may be updated based on the service degradation-level. For example for a service when service degradation-level increases the allowed requests, such as allowed API requests may be decreased by 10%. So, if the total allowed number of requests was set to 100 then on service degradation the total allowed number of requests may be reduced to 90.

According to some embodiments of the present disclosure, the sequence of the monitoring from an indication that there is service degradation to an indication that there is no service degradation may be as follows.

According to some embodiments of the present disclosure, once service degradation alarm 810 may be triggered, the service monitoring module, such as service monitoring module 170 and such as service monitoring lambda 820, may be triggered. The service monitoring lambda 820, may measure the service parameters and set a service degradation-level. The service status may be set to 'degraded'. Based on service degradation-level the total number of allowed requests may be set for that service. The parameters may be updated in a table, such as service status table 830.

According to some embodiments of the present disclosure, service monitoring lambda 820, may send requests to a request router, such as Nginx 840 and such as request router 150 in FIG. 1, to enter into throttle mode for that service and allow requests, such as API requests for that service based on the total number of allowed requests.

According to some embodiments of the present disclosure, service monitoring lambda 820, may create a scheduler 850 to monitor the service at a predefined interval, e.g., every 1 minute. After the predefined interval of the service monitoring lambda may be triggered, on each run the service monitoring lambda 820 may check if service degradation alarm 810 is turned off. If the alarm is turned off the service status table 830 may be updated and the service status may be set to 'normal'.

According to some embodiments of the present disclosure, the service monitoring lambda 820 may send a request to Nginx 840 to remove the throttle mode for the service. Once the alarm is removed the scheduler 850 may be stopped. If the alarm is turned on the service monitoring lambda 820 may check if the service has degraded further. This check may be performed by monitoring the service parameters such as CPU utilization, memory utilization and other parameters defined for that service. Based on service degradation the service degradation-level and the total allowed number of requests for that service may be determined.

According to some embodiments of the present disclosure, the service monitoring lambda 820 may send a request to Nginx 840 to set the total allowed number of requests for that service as per total allowed number of requests. If the alarm is turned on, the service monitoring lambda 820 may check if service parameters have been improved. This checking may be operated by monitoring the service parameters such as CPU utilization, memory utilization and other parameters defined for that service. Based on service improvement the service degradation-level and total allowed number of requests for that service may be determined. The service monitoring lambda 820 may send a request to Nginx 840 to set the total allowed number of requests for that service as per the total allowed number of requests that corresponds to the service degradation-level.

Figure 9:
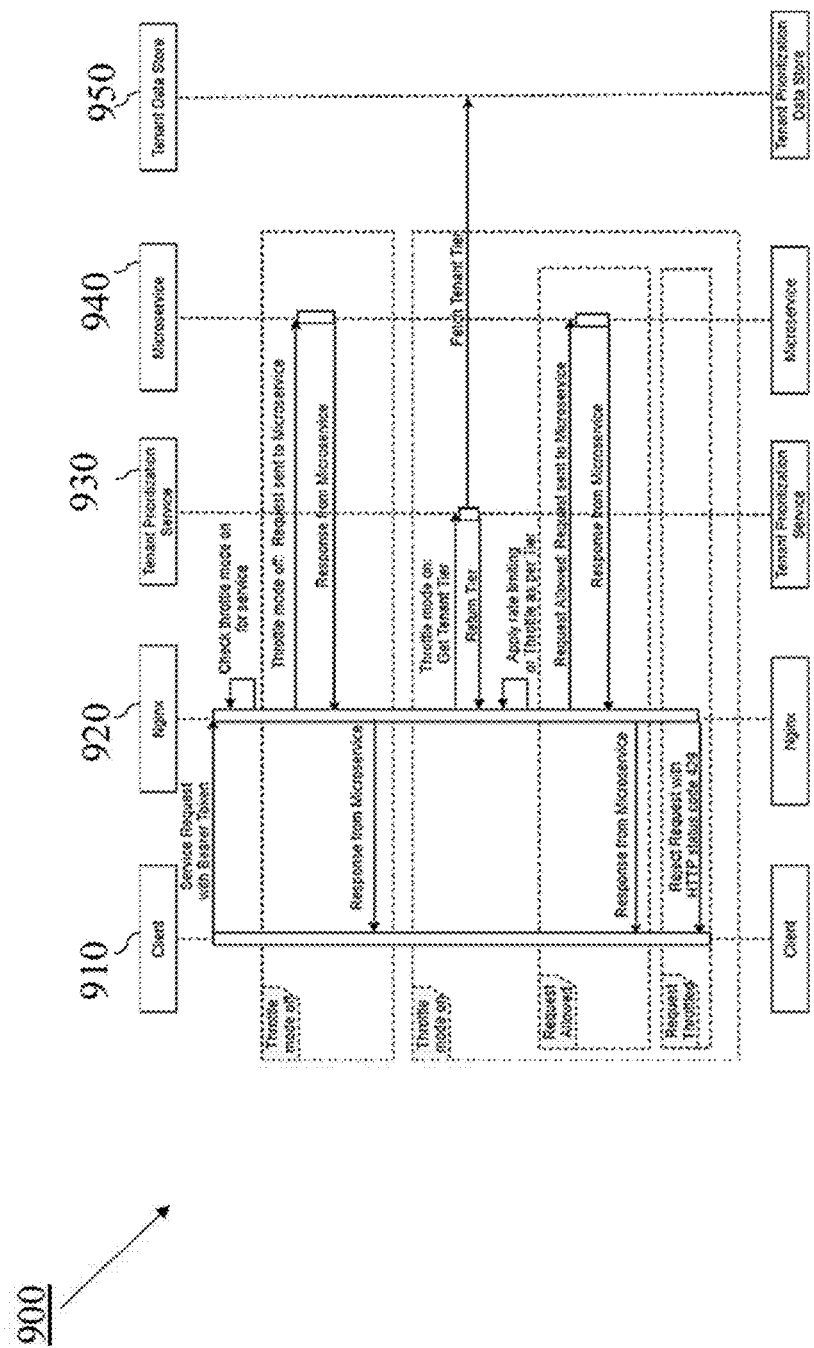
FIG. 9 is an example of a workflow of a request processing sequence, when throttle mode is on and off for a service, in accordance with some embodiments of the present disclosure.

FIG. 9 is an example 900 of a workflow of a request processing sequence, when throttle mode is on and off for a service, in accordance with some embodiments of the present disclosure.

According to some embodiments of the present disclosure, for example, when a client 910 calls an API, the API request passes through a request router, such as Nginx 920. Each request may contain a bearer token which may contain the tenant information. Requests that do not contain a bearer token are redirected to the login page for authentication.

According to some embodiments of the present disclosure, once the request may be authenticated the Nginx 920 may check if the service is in throttle mode. If the service is not in throttle mode e.g., throttle mode is off the request may be sent to the microservice, such as microservice 680 in FIG. 6, through a respective service load balancer. When receiving a response from the microservice the response may be sent back to the client 910.

According to some embodiments of the present disclosure, when throttle mode is on the TenantId may be sent to a module such as Tenant Prioritization service 930 and such as TP module 120 and such as TP module 200 in FIG. 2. The TP service 930 may return the tenant tier-level based on Tenant Request Prioritization (TRP) score. Accordingly, the request router, such as Nginx 920 may rates limit the requests based on the quota for that tier-level from the total allowed number of requests. The corresponding quota of service requests is a number of allowed requests per tenant tier-level.

According to some embodiments of the present disclosure, if as per tier-level the request may be allowed the request may be sent to the microservice via the service load balancer. On receiving response from the microservice the response may be returned to the client 910. If as per the tier-level the request should be throttled then the response with HTTP status code 429 may be returned indicating that the request was throttle and the client 910 has to retry after a specified interval.

FIG. 10A is an example 1000A of rate limit and throttling based on Tenant Prioritization (TP) module, in accordance with some embodiments of the present disclosure.

According to some embodiments of the present disclosure, once a tenant tier-level may be determined by a service monitoring module, such as service monitoring module 170 and a request router, such as request router 150 in FIG. 1 enters a throttle mode and receives a tier-level from a module, such as TP module 120 in FIG. 1, which has a corresponding quota from the total allowed number of requests for each tenant tier-level the request router may start rate limiting and throttling requests as follows. For example, when the total allowed number of requests is 30 and the quota for the provided tier-level '0' is 2% then only one request may be allowed per sec for tenants of that tier-level by the request router. In another example, when the total allowed number of requests is 30 and the quota for the provided tier-level '1' is 8% then only two requests may be allowed per sec for tenants of that tier-level by the request router.

According to some embodiments of the present disclosure, the configuration of the request router may be for example, tier-level '0' limit is 1 request per sec. burst=2× Rate=2, nodelay; tier-level '1' is 2 requests per sec, burst=2× Rate=4, nodelay. Therefore, since only one request of tier-level '0' may be allowed, request 1010a may be allowed on the first second-window and since burst size is 2 the remaining 2 requests 1020a may be queued and handled in subsequent seconds. The remaining 2 requests 1020a may be queued and handled in the second second-window 1020b, and one of them request 1020c may be allowed. The remaining request from the 2 requests 1020b may be handled in the third second-window 1020d.

According to some embodiments of the present disclosure, since only one request of tier-level '0' may be allowed, request 1010a may be allowed on the first second-window and since burst size is 2, request 1030 may be throttled with HTTP status code 429 by the request router.

FIG. 10B is an example of a tier categorization as per Tenant Request Prioritization (TRP) score, in accordance with some embodiments of the present disclosure.

According to some embodiments of the present disclosure, in a non-limiting example, TRP scores in a range of '0' and '0.99' may be categorized as tier-level '0'. TRP scores in a range of '1' and '1.99' may be categorized as tier-level '1'. TRP scores in a range of '2' and '2.99' may be categorized as tier-level 2. TRP scores in a range of '3' and '3.99' may be categorized as tier-level '3'. TRP scores in a range of '4' and '4.99' may be categorized as tier-level '4'. TRP scores in a range of '5' and above may be categorized as tier-level '5'.

FIG. 11 is an example 1100 of a table for calculating an account impact score for a tenant, in accordance with some embodiments of the present disclosure.

According to some embodiments of the present disclosure, a higher account impact score for a tenant means the tenant is a highly valued tenant and any disruptions may cause major loss to the tenant. The account impact score may be calculated as follows. The health score may be predetermined considering various business aspects such as tenant, revenue the tenant brings, business area, future revenue predictions from this customer, e.g., tenant and the like.

FIG. 12A is an example of a tenant prioritization table 1200A, in accordance with some embodiments of the present disclosure.

According to some embodiments of the present disclosure, for example, in a tenant prioritization table 1200A, a module, such as TP module 120 in FIG. 1 may maintain information as to the status of each tenant, the account impact score, the tenant type, tenant trend indicator, agents activity levels and call queue size. The information may be used to calculate the TRP score for each tenant.

FIG. 12B is an example of a service status table 1200B, in accordance with some embodiments of the present disclosure.

According to some embodiments of the present disclosure, for example, in a service status table 1200B, a module, such as TP module 120 in FIG. 1, may maintain information as to the status of the service, such as service name, status, allowed request count, throttle mode and degradation-level. It may be used by the monitoring service module to fetch the service degradation set in the past.

FIG. 13 is a table of simulation data shows how TRP score and tenant tier-level varies based on contact center specific parameters 1300, in accordance with some embodiments of the present disclosure.

According to some embodiments of the present disclosure, table 1300 shows how Tenant Request Prioritization (TRP) score and tenant tier-level varies based on contact center parameters.

According to some embodiments of the present disclosure, tenant 'T10' has TRP score '2.9' and tenant tier-level '2' and T11 has TRP score '3.3' and tenant tier-level '3'. The only different parameter between tenant T10 and tenant T11 is the agents activity level which is '0.1' for tenant T10 and '0.5' for T11.

According to some embodiments of the present disclosure, tenant 'T15' has TRP score '3.9' and tenant tier-level '3' and T16 has TRP score '4.5' and tenant tier-level '4'. The only different parameter between tenant T15 and tenant T16 is the call queue size which is '2' for tenant T15 and '5' for T16.

According to some embodiments of the present disclosure, tenant 'T23' has TRP score '5.7' and tenant tier-level '5' and T24 has TRP score '4.9' and tenant tier-level '4'. The only different parameter between tenant T23 and tenant T24 is tenant trend indicator, which is '2' for tenant T23 and '1' for T24.

FIG. 14A-14B are tables depicting results before an implementation of TP module when there are allowed request count has been set to 30 requests per second and the requests are sent in random order.

Tables 1400A and 1400B show results when the requests are throttled in random order and fewer of the higher tier-level tenants requests are allowed as compared to some of the lower tenant tier-level.

FIG. 15A is a table 1500A of quota for TP module, in accordance with some embodiments of the present disclosure.

FIGS. 15B-15C are tables 1500B-1500C depicting tenants prioritization based on an implementation of TP module, in accordance with some embodiments of the present disclosure.

According to some embodiments of the present disclosure, when requests are prioritized by a Tenant Prioritization module, such as TP module 120 in FIG. 1 and TP module 200 in FIG. 2, higher tenant tier-levels requests are less rejected as compared to lower tenant tier-level requests when the number of requests that were sent by each tier-level is the same.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for service monitoring and rate limiting for a service for a request router in a cloud-based Software as a Service (SaaS) platform contact-center, the computerized-method comprising:

in a cloud-computing environment that is operating a SaaS-platform-contact-center for one or more tenants, said cloud-computing environment comprising one or more processors, and a request-router, when a service monitoring module for a microservice of the SaaS platform-contact-center is operating and the request-router is in a throttle mode for a service of the microservice, said one or more processors are operating a Tenants Prioritization (TP) module, said TP module comprising:

determining a tenant tier-level having a determined quota of service requests;

receiving a degradation level from the service monitoring module, for a preconfigured period,
wherein each degradation level has a corresponding predefined total number of allowed requests;
wherein each tier-level has a corresponding quota of service requests from a total number of allowed requests, and wherein the corresponding quota of service requests is a number of allowed requests per tenant tier-level;

reducing the corresponding predefined total number of allowed requests by a first-threshold, when the received degradation level of the service of the microservice has degraded by a second-threshold, during the preconfigured period;

increasing the corresponding predefined total number of allowed requests by the first-threshold, when the received degradation level of the service of the microservice has improved by the second-threshold, during the preconfigured period; and instructing the request-router to get out of throttle mode for the service of the microservice, when the received degradation level of the service of the microservice has improved by the second-threshold during the preconfigured period and there is no indication that the service of the microservice has been degraded.

2. The computerized-method of claim 1, wherein the service monitoring module for a microservice of the SaaS-platform-contact-center is operating to: (i) define the degradation level based on one or more parameters; (ii) store the degradation level in the data store of TP; and (iii) set the request-router into a throttle mode for the service of the microservice.

3. The computerized-method of claim 1, wherein corresponding quota of service requests of each tier-level is a percentage of the total number of allowed requests.

4. The computerized-method of claim 2, wherein the TP module is operating while there is an indication that the service of the microservice has been degraded.

5. The computerized-method of claim 2, wherein the one or more parameters are selected from at least one of Central Processing Unit (CPU) utilization of service, service data store CPU utilization, number of requests for a service and request latency.

6. The computerized-method of claim 1, wherein the service monitoring module is further operated to determine the number of allowed requests per tenant tier-level based on the degradation level, a number of instances of the service and the corresponding quota of service requests of the tier-level.

7. The computerized-method of claim 1, wherein the TP module further comprising:

periodically pulling data from an Automatic Call Distribution (ACD) system to calculate agent-activity-levels and call-queue-size; and maintaining the calculated agent-activity-levels, the calculated call-queue-size, a tenant trend indicator and a preconfigured account-impact-score of the tenant, in the data storage of TP, wherein the tenant tier-level is determined based on a calculated Tenant Request Prioritization (TRP) score.

8. The computerized-method of claim 7, wherein the calculated agent activity levels are based on formula I:

$$\text{Agent activity levels} = \text{average of (number of active agents/total number of logged-in agents)} \qquad (I)$$

wherein the agent activity levels are calculated for a preconfigured period.

9. The computerized-method of claim 8, wherein the TRP score is calculated based on formula II:

$$\text{TRP score} = (W_1 \times \text{account impact score}) + (W_2 \times \text{agent activity levels}) + (W_3 \times \text{tenant trend indicator} \times \text{call queue size}) \qquad (II)$$

whereby:
value of $W_1$, $W_2$ and $W_3$ is preconfigured.

10. The computerized-method of claim 9, wherein the value of $W_1$, $W_2$ and $W_3$ is preconfigured by default to: $W_1=0.1$, $W_2=1.0$ and $W_3=0.2$.

11. The computerized-method of claim 7, wherein the determining of the tenant tier-level based on the calculated Tenant Request Prioritization (TRP) score is based on one or more ranges of TRP score, wherein each range of the one or more ranges of TRP score is preconfigured to correspond to a tier-level.

12. The computerized-method of claim 1, wherein the account impact score is preconfigured according to one or more parameters.

13. The computerized-method of claim 12, wherein the one or more parameters are selected from at least one of: health score, handle critical services, partner type, success package, market segment and specific partner.

14. The computerized-method of claim 1, wherein when the service monitoring module for a microservice is monitoring one or more parameters which indicate that the service has been degraded, said service monitoring module is redefining the degradation-level.

15. The computerized-method of claim 1, wherein the determined quota of requests per second is per tenant tier-level.

16. A computerized-system for service monitoring and rate limiting for a service for a request router in a cloud-based Software as a Service (SaaS) platform contact-center, the computerized-system comprising:

one or more processors; and
a request router,
when a service monitoring module for a microservice of the SaaS-platform-contact-center is operating and the request-router is in a throttle mode for a service of the microservice,
said one or more processors are operating a Tenants Prioritization (TP) module, said TP module is configured to:
determine a tenant tier-level having a determined quota of service requests;
receiving a degradation level from the service monitoring module, for a preconfigured period,
wherein each degradation level has a corresponding predefined total number of allowed requests;
wherein each tier-level has a corresponding quota of service requests from a total number of allowed requests, and wherein the corresponding quota of service requests is a number of allowed requests per tenant tier-level;
reduce the corresponding predefined total number of allowed requests by a first-threshold, when the received degradation level of the service of the microservice has degraded by a second-threshold during the preconfigured period;
increase the corresponding predefined total number of allowed requests by the first-threshold, when the received degradation level of the service of the microservice has improved by the second-threshold, during the preconfigured period, and
instruct the request-router to get out of throttle mode for the service of the microservice, when the received degradation level of the service of the microservice has improved by the second-threshold during the preconfigured period and there is no indication that the service of the microservice has been degraded.

* * * * *